(12) United States Patent
Baskin et al.

(10) Patent No.: US 11,740,083 B2
(45) Date of Patent: Aug. 29, 2023

(54) METHODS AND APPARATUS FOR CURBSIDE SURVEYING

(71) Applicant: Google LLC, Mountain View, CA (US)

(72) Inventors: Jacob Baskin, Brooklyn, NY (US); Adam Feldman, New York, NY (US); Neha Rathi, New York, NY (US)

(73) Assignee: Google LLC, Mountain View, CA (US)

( * ) Notice: Subject to any disclaimer, the term of this patent is extended or adjusted under 35 U.S.C. 154(b) by 278 days.

(21) Appl. No.: 15/971,154

(22) Filed: May 4, 2018

(65) Prior Publication Data

US 2018/0321031 A1    Nov. 8, 2018

Related U.S. Application Data

(60) Provisional application No. 62/501,291, filed on May 4, 2017.

(51) Int. Cl.
| | | |
|---|---|---|
| *G01C 11/00* | (2006.01) | |
| *G01C 3/08* | (2006.01) | |
| *G01C 21/12* | (2006.01) | |
| *G01C 5/00* | (2006.01) | |
| *H04N 5/33* | (2023.01) | |

(Continued)

(52) U.S. Cl.
CPC ............... *G01C 11/00* (2013.01); *G01C 3/08* (2013.01); *G01C 5/00* (2013.01); *G01C 11/02* (2013.01); *G01C 15/008* (2013.01); *G01C 21/12* (2013.01); *G06T 7/74* (2017.01); *G06V 20/20* (2022.01); *G06V 30/142* (2022.01); *H04N 5/33* (2013.01); *G06T 2207/10048* (2013.01)

(58) Field of Classification Search
USPC ......................................................... 382/103
See application file for complete search history.

(56) References Cited

U.S. PATENT DOCUMENTS 9,400,930 B2 * 7/2016 Moeglein .................. G01S 5/16
2012/0092190 A1   4/2012 Stefik et al.
(Continued)

FOREIGN PATENT DOCUMENTS

EP    2 444 924 A1    4/2012
EP    2 711 881 A2    3/2014

OTHER PUBLICATIONS

International Search Report and Written Opinion dated Feb. 26, 2021 for International Application No. PCT/US2021/012172, 14 pages.

(Continued)

*Primary Examiner* — Ishrat I Sherali
(74) *Attorney, Agent, or Firm* — Lerner David LLP

(57) ABSTRACT

Visual-inertial odometry uses visual input from a camera and inertial motion measurements to track the motion of an object. This technique can be applied to surveying urban environments, such as a curb or streetscape, that are impractical to survey with a surveyor's wheel, GPS, or imagery from cars. Making visual-inertial odometry measurements of a curb with a handheld surveying device yields relative measurements from a starting point to an ending point on the curb. These relative measurements can be pinned to an absolute coordinate frame using measurements of gravity made while acquiring the visual-inertial odometry measurements and absolute measurements of the starting and ending points.

12 Claims, 11 Drawing Sheets

(51) Int. Cl.
　　　*G06T 7/73*　　　(2017.01)
　　　*G01C 15/00*　　　(2006.01)
　　　*G01C 11/02*　　　(2006.01)
　　　*G06V 20/20*　　　(2022.01)
　　　*G06V 30/142*　　(2022.01)

(56) References Cited

U.S. PATENT DOCUMENTS

2013/0083964 A1* 4/2013 Morris .................. G01S 17/89
　　　　　　　　　　　　　　　　　　　　　　　382/103
2015/0094089 A1* 4/2015 Moeglein .................. G01S 5/16
　　　　　　　　　　　　　　　　　　　　　　　455/456.1

OTHER PUBLICATIONS https://en.wikipedia.org/wiki/Surveyor%27s_wheel; Surveyor's Wheel, retrieved on Aug. 5, 2019, 2 pages.
https://geospatial.trimble.com/products-and-solutions/trimble-r2; Trimble, retrieved on Aug. 5, 2019, 13 pages.
https://web.archive.org/web/20170411003303/https://get.google.com/tango/; Tango, Apr. 2017, 4 pages.
https://developers.google.com/tango/overview/depthperception; retrieved on Aug. 5, 2019, 2 pages.
Berland, A. & Lange, D. A., "Google Street View shows promise for virtual street tree surveys," Urban Forestry & Urban Greening, 21:11-15 (2017), 5 pages.

* cited by examiner

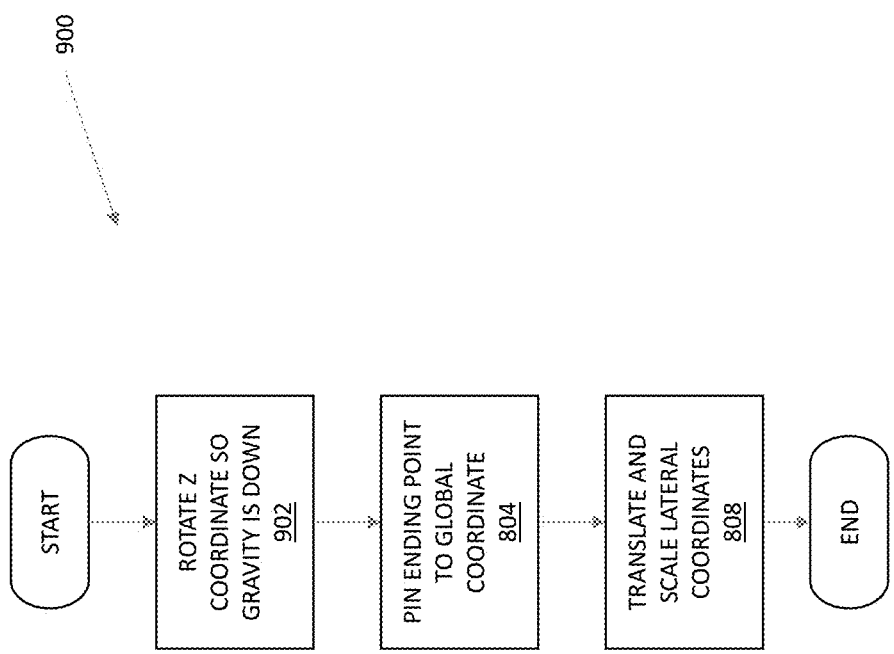

METHODS AND APPARATUS FOR CURBSIDE SURVEYING

CROSS-REFERENCE TO RELATED APPLICATION(S)

This application claims the priority benefit, under 35 U.S.C. § 119(e), of U.S. Application No. 62/501,291, which was filed on May 4, 2017, and is incorporated herein by reference in its entirety.

BACKGROUND

Surveying can be expressed as the problem of identifying objects and determining their positions in the world. Traditional surveying techniques involve measuring distances and angles from known points using tools like theodolites, which achieve this accuracy but need significant training to use and are in any event extremely time-consuming to use. In practice today, surveying things like parking signs is usually done with a surveyor's wheel (see, e.g., https://en.wikipedia.org/wiki/Surveyor %27s_wheel). While this can achieve the desired accuracy, it is easy to use badly (compromising accuracy) and is also quite time consuming.

Recently, survey-quality Global Positioning System (GPS) has come into wider use, for instance, as described at http://www.trimble.com/Survey/R2GNSSReceiverforSurvey.aspx. These systems use a number of techniques to improve GPS accuracy to the necessary level. These systems have their own drawbacks, however. The principal one is that they require much better antennas than are found in consumer-level GPS equipment and therefore often require more power to operate. This makes survey-quality GPS devices bulkier, heavier, and much more expensive than other surveying tools. Additionally, even survey quality GPS can be significantly inaccurate in "urban canyons," where tall buildings obscure the line of sight that is necessary for GPS to function.

SUMMARY

The present technology relates to surveying a curb with a surveying device comprising a camera and an inertial measurement unit. As described in greater detail below, the present technology is simpler to use, collects more information, and yields more accurate curb surveys than surveyor's wheels. It is also smaller, lighter, more efficient, and less susceptible to "urban canyon" effects than survey-quality GPS devices.

In one example of this technology, a surveyor (a person) starts starting a visual inertial odometry measurement by the surveying device at a predefined starting point on the curb. The surveyor traverses a path along the curb from the predefined starting point to a predefined ending point on the curb while carrying or holding the surveying device. The surveyor acquires an image of an object on the curb, such as a sign, fire hydrant, or painted section of curb, with the surveying device while traversing the path. The surveying device records object coordinates associated with the image of the object. These coordinates are in a survey coordinate frame having the predefined starting point as the origin. And the surveyor ends the visual inertial odometry measurement by the surveying device at the predefined ending point on the curb.

In some cases, the surveying device measures a direction of gravity while acquiring the image of the object. In these cases, a processor in or in communication with the surveying device rotates the survey coordinate frame to align a vertical axis in the survey coordinate frame with the direction of gravity. This processor may also rotate the survey coordinate frame about the vertical axis in the survey coordinate frame based on the predefined starting point in the survey coordinate frame and a Geographic Information System (GIS) coordinate frame. In addition, the processor may translate and/or scale lateral coordinates in the survey coordinate frame to respective coordinates in the GIS coordinate frame.

Another example apparatus for surveying a curb includes a camera, an inertial measurement unit (IMU), and a processor operably coupled to the camera and the IMU. In operation, the camera automatically acquires images of objects on the curb while the apparatus is traversing a nonlinear path along the curb. The IMU measures a motion of the apparatus while the apparatus is traversing the nonlinear path along the curb. And the processor performs a visual inertial odometry measurement based on the images and the motion of the apparatus from a predefined starting point on the curb to a predefined ending point on the curb while the apparatus is traversing the nonlinear path along the curb.

The IMU can also measure a direction of gravity while the apparatus is traversing the nonlinear path along the curb. Similarly, the processor can record a height of the apparatus above the curb while the apparatus is traversing the nonlinear path along the curb.

The apparatus may also include an infrared (IR) light source and an IR detector. In operation, the IR light source illuminates an object on the curb with IR structured illumination, and the IR detector detects IR structured illumination scattered or reflected by the object on the curb. The processor determines a distance to the object based on the IR structured illumination detected by the IR detector.

Another example of the present technology includes a method of surveying a curb with a handheld surveying device comprising a camera and an IMU. This method includes starting a visual inertial odometry measurement with the handheld surveying device at a predefined starting point on the curb. The IMU measures a direction of gravity while performing the visual inertial odometry measurement. A processor in or communicatively coupled to the handheld surveying device estimates coordinates of objects along the curb in a coordinate frame of the handheld surveying device based on the visual inertial odometry measurement. This processor or another processor aligns a vertical axis of the coordinate frame of the handheld surveying device with the direction of gravity and aligns the coordinate frame of the handheld surveying device to a GIS coordinate frame based on the predefined starting point to yield a survey of the curb.

Making the visual inertial odometry measurement may involve carrying the handheld surveying device along a nonlinear path along the curb from the predefined starting point toward a predefined ending point on the curb. It can also include acquiring a still image of at least one object on the curb and acquiring video-rate imagery of the curb. The still image and/or the video-rate imagery may be used to determine a height of the object on the curb. The handheld surveying device may end visual inertial odometry measurement at a predefined ending point on the curb. In this case, the processor aligns the coordinate frame of the handheld surveying device to the GIS coordinate frame comprises in part by locating the predefined starting point and the predefined ending point in the GIS coordinate frame.

If the handheld survey device includes an IR structured light source and an IR camera, it can illuminate an object on the curb with IR structured illumination emitted by the IR structured light source. The IR camera detects IR structured illumination scattered or reflected by the object on the curb. And the processor determines a distance to the object on the curb based on the IR structured illumination detected by the IR camera.

The processor can also reconcile the first survey of the curb with a second survey of the curb based on images of the at least some of the images showing the first object and the second object.

In some cases, the visual inertial odometry measurement is a first visual inertial odometry measurement. In these cases, the method includes starting a second visual inertial odometry measurement by the surveying device in response to an interruption in the first visual inertial odometry measurement before reaching a predefined ending point on the curb. This second visual inertial odometry measurement includes images of at least two objects imaged during the first visual inertial odometry measurement. The images of these common objects can be used to aligning the first visual inertial odometry measurement with the second visual inertial odometry measurement.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 9 illustrates a process for processing survey data.

DETAILED DESCRIPTION

Figure 1:
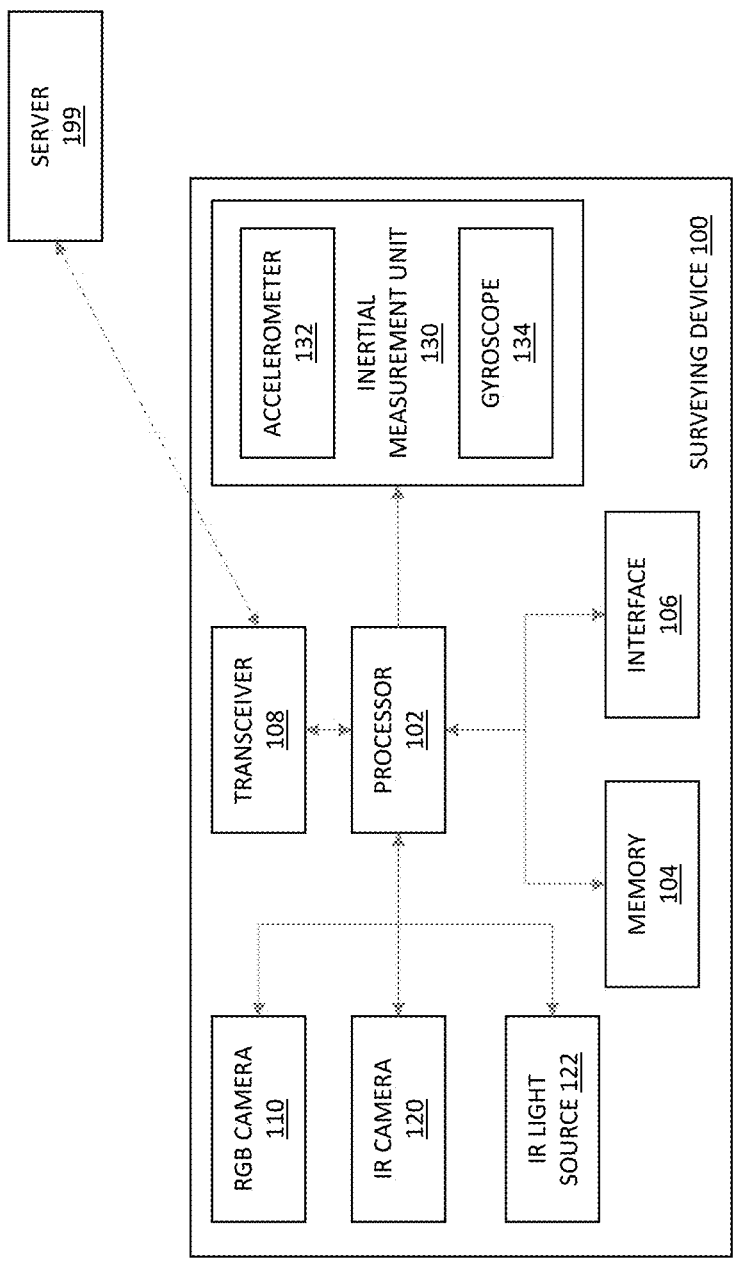
FIG. 1 shows a surveying device for surveying curbside features, including street signs, fire hydrants, and curb cuts.

The curb of a city street is full of life. It is the home of bus stops, parking meters, park benches, newsstands, food carts, bicycle parking racks, and street signs. But in most cities, there's no way to find out what's on a curb without visiting it in person. This is a problem, especially for parking, which often suffers from confusing and sometimes contradictory signage, possibly due to incoherent parking policies. Confusing or missing parking signs can lead drivers to circle the city block searching for parking, wasting time and contributing to gridlock, noise pollution, and air pollution. Confused drivers may also park illegally, racking up parking fines and blocking bus stops and building entrances.

The surveying techniques disclosed here can provide information about the types and locations of street signs, parking meters, and other objects that affect street parking and other curbside activities, such as loading, unloading, and bus stops. They involve surveying the curb with a handheld surveying device that uses visual inertial odometry to measure relative position and an intuitive interface to capture images of curbside objects yields data that can be tagged with Geographic Information System (GIS)-importable positions. The interface enables a user to capture imagery and to measure relative position on the curb. Data entry can happen later and may be computer-assisted. This yields curbside survey data that is as good as or better than current survey data, yet can be acquired faster and with less user training.

The present surveying techniques use simultaneous localization and mapping (SLAM) with surveying techniques to produce images of signs tagged with GIS-importable positions, measurements of sign positions along block faces, and/or locations of curb cuts and paint. SLAM uses odometry techniques to build a map of a space, but it does not fix the absolute position (i.e., latitude and longitude) of individual objects. The relative measurements made using SLAM can be combined with absolute measurements of known reference points to transform the object locations in the SLAM space, also called the survey coordinate frame, into an absolute or global coordinate frame compatible with a GIS.

SLAM can be considered to be the computational problem of constructing or updating a map of an unknown environment while simultaneously keeping track of an agent's location within the unknown environment. SLAM often involves visual odometry, which is a technique that uses visual input from cameras to track the motion of an object, such as a robot or smartphone. Visual odometry can be extended to "visual inertial odometry," which uses both visual input and inertial sensing (e.g., with a gyroscope, accelerometer, inertial measurement unit, etc.). An example of a visual inertial odometry platform is Google Tango (https://get.google.com/tango/), which is used mainly to position virtual objects, like characters in a game, in a realistic way on top of a real scene for augmented reality.

The present survey technology applies visual odometry and/or visual inertial odometry to surveying. The survey technology disclosed here is particularly useful for surveying things that are situated along roads. For instance, it can used to determine where exactly a parking sign is located. This knowledge can be used to figure out what part of which street the parking sign applies to. It works just as well in urban canyons as anywhere. It may be possible to gauge relative or absolute distances between objects by comparing photos from mapping cars (like Google Street View) using the same visual odometry techniques. This has been used to survey street trees, but is relatively inaccurate. Additionally, some features (like curb cuts or fire hydrants) are often obscured from the view of cars on a road, while a technique performed by a person with a cell phone or other handheld device is more resilient and flexible.

Technical Problems Addressed by Inventive Surveying Techniques

The inventive curbside surveying techniques address technical problems with existing survey methods, which tend to be expensive, inaccurate, or both expensive and inaccurate when used for curbside surveying. For instance, it is extremely difficult to make a straight-line measurement with a survey wheel, especially on a sidewalk or street with an uneven surface and littered with obstacle. With a handheld surveying device, however, the surveyor doesn't have to follow a straight line; they can follow an arbitrary path in two-dimensional (2D) or three-dimensional (3D) space and use SLAM to build a 3D map of the curbside environment from objects appearing in pictures acquired by the handheld surveying device as it moves. Correlating position information derived by performing fuzzy matching on the objects in the pictures with position information from the device's accelerometer and inertial measurement unit (IMU) yields an accurate survey regardless of the device's path.

Curbside surveying with a handheld surveying device also yields information about height, which is impossible to measure with a surveyor's wheel. Height information is just one piece of the 3D location information derived automatically from pictures, IMU data, and accelerometer measurements made by the handheld surveying device. In fact, the height information derived automatically from the pictures, IMU data, and accelerometer measurements acquired with the handheld surveying device is more accurate than height (altitude) measurements made with GPS-based surveying tools, which tend be even less accurate for vertical measurements than for horizontal measurements.

GPS-based surveying doesn't work in "urban canyons" formed by tall buildings. And deriving curbside object locations from "street view" data (e.g., photographs available on Google Maps) is algorithmically unsolved. Besides, street view data lacks features like fire hydrants and painted sections of curb that may be obscured or out of the camera's line of sight. These objects can be identified and imaged much more easily by a person walking along the curb or sidewalk with a handheld surveying device than by a car-mounted camera, which may miss them entirely.

The inventive technology also addresses several technical problems arising in the context of curbside surveying with a handheld survey device. For example, the inventive technology can align different measurements of the same section of curb to produce accurate curbside surveys. Different measurements may be acquired by different people or by the same person at different times. If the measurements are different, they can be consolidated during postprocessing using a combinatorial optimization algorithm, such as the Hungarian algorithm (aka the Kuhn-Munkres algorithm), to reduce errors and improve precision. As understood by those of skill in the arts of computer science and applied mathematics, a properly programmed processor can execute a combinatorial optimization algorithm to find an optimal object (e.g., a "most accurate" curb measurement) from a finite set of objects (e.g., a finite set of curb measurements).

The inventive technology can also be used to align measurements of overlapping sections of curb. A handheld surveying device may record overlapping or discontinuous measurements due to a loss in network connectivity for location services, glare in the pictures, loss of power (e.g., due to battery failure), app malfunction, or other interruption. Fortunately, the measurements can be linked together using objects that appear in both sets of pictures acquired using the handheld surveying device. Because the handheld surveying device measures relative position, the data that it captures is anchored using known starting and ending locations. These known starting and ending locations are used to align the relative position and direction captured by the device with the real world. But what happens if someone surveys two-thirds of a curb, capturing numerous features, and then doesn't get all the way to the end? The partial survey includes lots of relative data, but can't be anchored to the real world using standard techniques because the surveyor didn't reach the known ending location. Instead of starting over from the known starting location, the surveyor can re-capture two or more features that they've already photographed from the end of the partial survey. Assuming these features haven't moved, they can be used to anchor the partial surveys to the new survey. When the surveyor finishes the new survey, she'll have a first survey of the (known) start of the curb, several features, and two shared features and a second survey with the two shared features, more features, and the (known) end of the curb. Using the two shared features to align the first survey to the second survey puts the start of the curb and the end of the curb in the same relative coordinate system, which can in turn anchor the relative measurement from both surveys to the real world just as we would for a single survey. (One algorithm for aligning sets of points to reduce or minimize the positional error is called the Kabsch algorithm.)

Postprocessing can also reduce the burden on the surveyor, for example, by reducing or eliminating the need to label objects in the field. Instead of labeling objects in pictures while taking the pictures, an artificial neural network (ANN) or other deep learning network (DLN) executed by the handheld surveying device's processor or a processor in a server or other postprocessing processor. This reduces both the amount of time required to identify objects and, for a sufficiently trained ANN, the likelihood of user error. The ANN can also check for particular items (e.g., a stop sign, traffic light, parking sign, etc.) or linear features (e.g., painted feet of curb) in a given data set or in data sets representing the same section of curb. If it detects a discrepancy, such as an unexpected object, the absence of an expect object, or a mismatch between different data sets, the ANN may flag the section of curb for an additional survey, increasing the accuracy of the final survey.

Handheld Surveying Devices

FIG. 1 shows a handheld surveying device 100 that can be used to acquire images of curbside features and imagery for visual inertial odometry. It can be implemented as a Tango-equipped phablet, tablet, or smartphone that costs under $500 and weighs less than 10 ounces. As shown in FIG. 1, the surveying device 100 includes a processor 102 that is coupled to a memory 104, a user interface 106 (e.g., a touchscreen), a transceiver 108 (e.g., a Wi-Fi or cellular transceiver), a visible (red-green-blue (RGB)) camera 110, an optional infrared (IR) camera 120, an optional IR structured light source 122, and an IMU 130, which may include an accelerometer 132 and a gyroscope 134.

In operation, a surveyor can use the interface 106 and the visible camera 110 to take and tag pictures of street signs, fire hydrants, parking meters, curb cuts, and other objects on or near the curb or sidewalk next to a city street. In some cases, the surveyor may also capture IR images with the IR camera 120. In these cases, the IR structured light source 122 may illuminate the scene with structured illumination whose structure or pattern can be used to infer distance to objects in the image. The processor 102 stores this information in the memory 104 along with data about the surveying device's acceleration and orientation acquired by the accelerometer 132 and gyroscope 134 in the IMU 130.

In addition, the visible camera 110 and/or the IR camera 120 may automatically acquire images at regular intervals (e.g., at rates of 1-5 frames per second, 10 frames per second, 30 frames per second, or 60 frames per second) as the surveyor walks along the street. The processor 102 uses this data, together with acceleration and orientation data, including information about the orientation of the gravity vector, from the IMU 130, to estimate the surveying device's relative position using visual odometry, visual inertial odometry, or another suitable SLAM technique. The processor 102 stores these relative position measurements, in the survey coordinate frame, in the memory 104 and/or transmits them to a server 199 via the transceiver 108. If desired, the surveyor may view representations of these relative coordinates along with thumbnail images of the photographed objects on the interface 106. The processor 102 also confirms or determines the surveying device's absolute position at the starting and ending points, which may be predefined, by using the transceiver 108 to acquire Wi-Fi or GPS positioning data in response to commands received via the interface 106.

A Curbside Surveying Process

Figure 2:
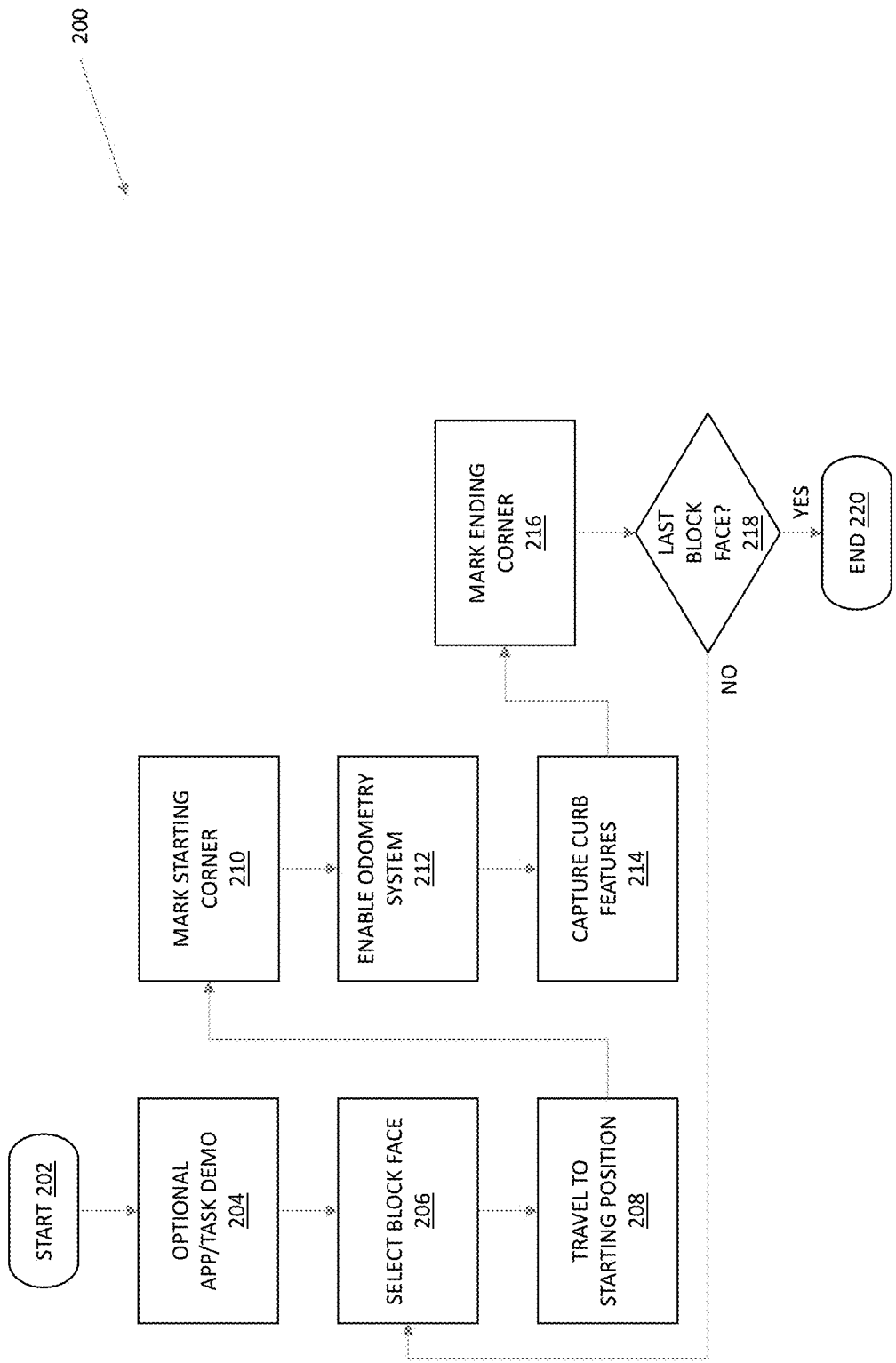
FIG. 2 is a flow diagram that illustrates a process for surveying streetscapes using, e.g., the surveying device shown in FIG. 1.
Figures 3A, 3B:
FIG. 3A is a screenshot of a training demonstration and review of curbside features that can be imaged and annotated using an example surveying device.
FIG. 3B shows a script for the training demonstration and review of curbside features of FIG. 3A.

FIG. 2 illustrates a process 200 for surveying a curbside or streetscape using the surveying device shown in FIG. 1. The process 200 starts with the surveyor receiving a surveying device equipped with a visual or visual inertial odometry system (step 202). If desired, the surveyor is trained on the surveying device by viewing a quick demonstration of the surveyor task workflow displayed via the surveying device's interface (step 204). The demonstration may provide a review of curbside feature types that the surveyor is supposed to image as shown in FIGS. 3A and 3B.

Figure 4:
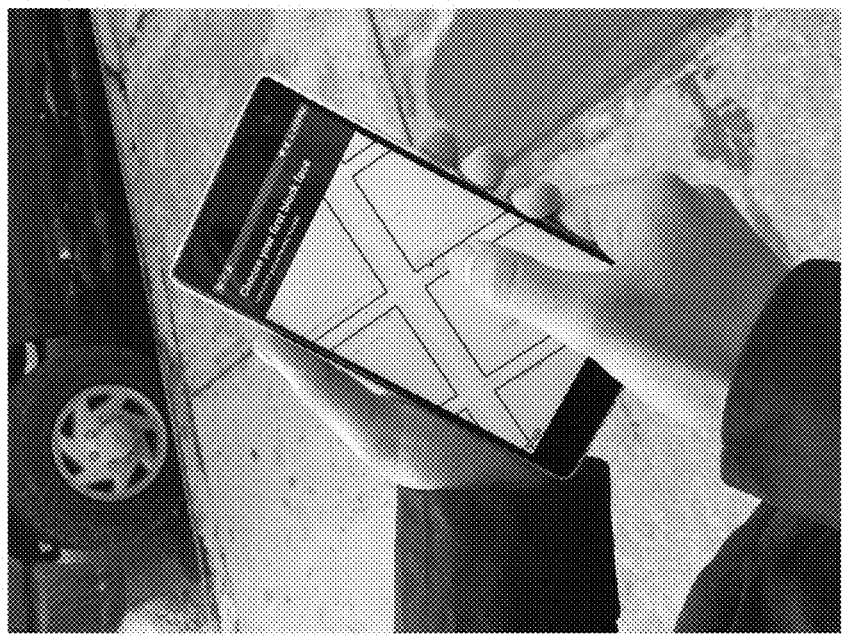
FIG. 4 is a screenshot of selecting a block face using an example surveying device.
Figure 5:
FIG. 5 is a screenshot of marking a starting corner of a block using an example surveying device.

In step 206, the surveyor selects a block face or other region to survey from among marked curbs on a map displayed on the surveying device as shown in FIG. 4. The selected block is highlighted, and the starting corner is marked with a pin. The surveyor may select the block face from among a range of possibilities or in response to instructions to go to a certain street corner (say, the southeast corner of $10^{th}$ Avenue and 30th Street). If not already there, the surveyor travels to the starting corner (step 208) and marks it using the surveying device (step 210) as shown in FIG. 5, e.g., by hitting the "Arrived at Corner" button when standing at the actual corner. This causes the surveying device to start a visual (inertial) odometry measurement with its camera, processor, and inertial measurement unit (step 212).

Once the surveying device has started measuring its position relative to the starting point using visual (inertial) odometry, the surveyor travels along the block from the starting position to the ending position (e.g., the next street corner). As the surveyor walks, he or she follow a curved or discontinuous path along the sidewalk. At the same time, the surveyor may carry the surveying device along a nonlinear path (i.e., a path that curves or bends gently or sharply) in three dimensions. For example, the surveyor may wander back and forth along the curb, stopping to take pictures and swerving to avoid people and objects, while the surveying device bobs up and down in his or her hands.

Along the way, the surveyor identifies objects of interest (like parking signs) and takes photographs of the objects using the surveying device (step 214). For instance, the surveyor may walk along the curb with the street to his or her left. When the surveyor comes across a sign, curb paint, or curb cut, he or she hits the appropriate curb feature button on the surveying device to open the camera.

Figure 6A:
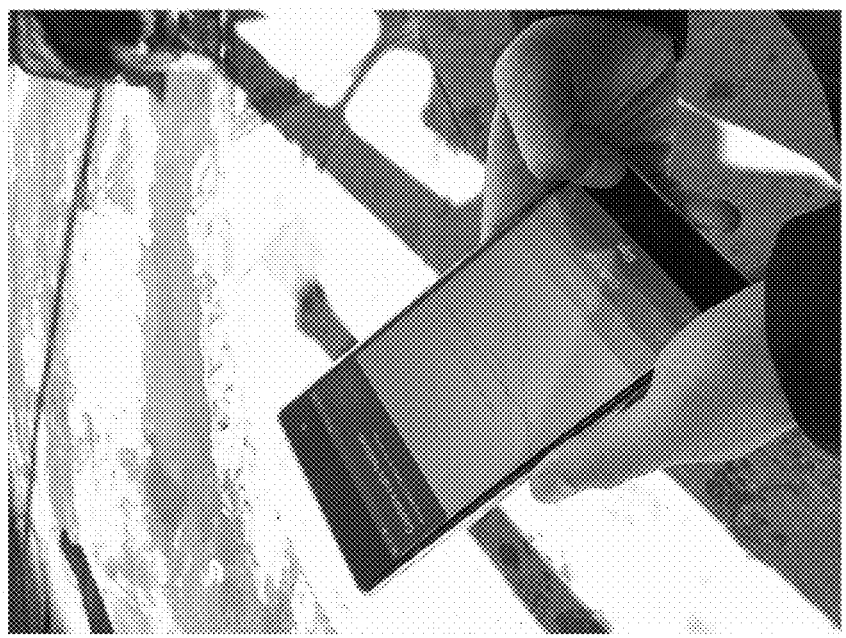
FIGS. 6A-6C are screenshots of capturing curb features using an example surveying device.
Figure 6C:
Figure 6B:

FIGS. 6A-6C are screenshots that illustrate how a surveyor captures curb features using the surveying device. The surveyor may stand 2-3 feet from the feature and take a photo. If the surveyor is satisfied with an image, he or she may save it; otherwise, the surveyor can take another photo and save it instead. The surveyor repeats this process to capture images of relevant objects on that side of the block. The surveying device logs the captured features as thumbnails on a timeline so the surveyor can look back and review what he or she has captured along that block. The timeline may be marked with the position of each object (or of the surveyor as he or she took the picture of the object) in the survey coordinate frame, which is relative to the starting point.

While the surveyor walks from the starting point to the ending point taking pictures of curbside features, the surveying device determines and records its own position in three dimensions (e.g., x, y, and z coordinates) and orientation relative to its position and orientation at the starting street corner. It does this by taking pictures, e.g., at video rates (about 24 frames per second (fps), 25 fps, about 30 fps, 50 fps, or about 60 fps depending on the resolution), and estimating movement between images using visual (inertial) odometry. In addition, the surveying device uses its accelerometer (an inertial system) to sense and record the direction of gravity for use in orienting the relative visual odometry measurements with respect to absolute (GIS) coordinates. In some cases, the surveying device uses IR images of objects illuminated with structured illumination to measure the distance to the objects. The surveying device can optionally record this distance information as well when the photo is taken, ensuring first that the surveyor points the surveying device exactly at the object being surveyed.

Figure 8:
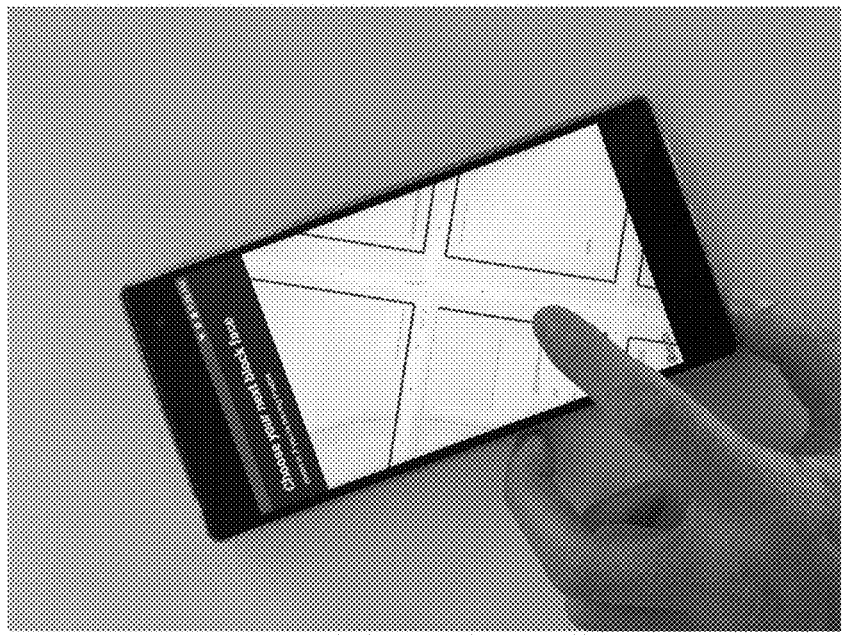
FIG. 8 is a screenshot of selecting the next block face using an example surveying device.
Figure 7:
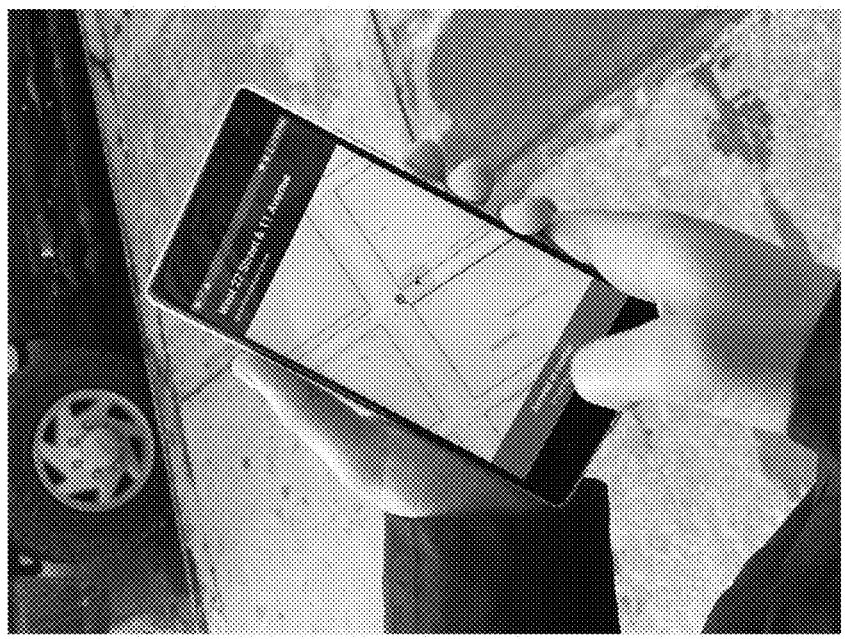
FIG. 7 is a screenshot of marking an ending corner of the block using an example surveying device.

When the surveyor reaches the destination (e.g., the next street corner), the surveyor notes this with the surveying device, and the surveying device records its position relative to the starting street corner (step 216). More specifically, the surveyor may hit "Finish Block" in the top right of the surveying device's touchscreen display after capturing all the features on that block as shown in FIG. 7. Then the surveyor hits "Mark Corner" when standing at the actual corner marked by the pin on the map as shown in FIG. 8. This ends the visual (inertial) odometry measurement for the block. Once the surveyor has completed a block, the completed block may appear highlight on a map displayed by the surveying device.

If the surveyor has reached the last block face, the process 200 ends (steps 218 and 220). If not, the surveyor selects the next block face (step 206) and proceeds to another corner (say, the southwest corner of 9th Avenue and $30^{th}$ Street) to repeat the curb capture process while moving down the next block.

In practice, even without the distance information optionally collected during curb capture using structured IR illumination and the IR camera, it is possible to achieve positional accuracies of about ±1 meter, which is significantly better than cell phone GPS in urban areas. For many surveying applications, however, accuracy within a meter or less is desired. This is useful for understanding street regulations as well as for construction and can be achieved with the present technology faster and less expensively than possible with other techniques.

Processing Curbside Survey Data

Visual (inertial) odometry produces relative measurements: it yields the "x," "y," and "z" distances from the start of measurement to the current position, but doesn't necessarily determine how the axes of its coordinate system correspond to the real world. Fortunately, the starting and ending positions can be determined before the survey begin from an existing map, which can be checked against satellite imagery for accuracy. Because the real-world positions of the start and end points are known or can be determined with great accuracy, they can be used with the gravity vector measurements to orient the relative measurements in the survey coordinate frame. This coordinate transformation can be performed in a postprocessing step once the data has been collected.

FIGS. 9 and 10A-10D illustrate a process 900 for turning survey data acquired with the surveying device into GIS-tagged images and annotations. This method can be executed by a suitable processor, e.g., a survey device's processor or a server that communicates with a survey device, and involves transforming data in the survey coordinate frame to a global coordinate frame—here, a Mercator projection in GIS-compatible, real-world coordinates. The inputs include survey data, such as photographs of curbside objects, taken in the survey coordinate frame with x, y, and z coordinates measured with respect to the starting point, which is taken as the origin of the survey coordinate frame. Other inputs include measurements of the direction of gravity in the device coordinate frame, which is measured with the surveying device itself as the origin.

Generally, the data is transformed from the survey coordinate frame to the global coordinate frame by pinning the starting point (origin) and ending point in the survey coordinate frame to the corresponding (known) coordinates in the global coordinate frame. (The global coordinate frame coordinates of the starting and ending points may be known a priori or determined from Wi-Fi or GPS measurements.) Once the starting and ending points are pinned in place, the lateral (x and y) coordinates in the survey coordinate frame are rotated, translated, and scaled to correspond to coordinates in the global coordinate frame.

Figure 10A:
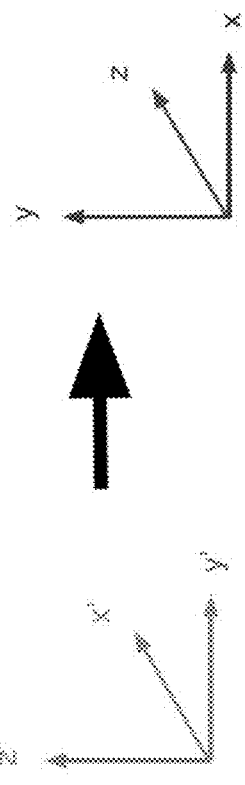
FIGS. 10A-10D illustrate the coordinate transformation and rotations in the process of FIG. 9.
Figure 10B:
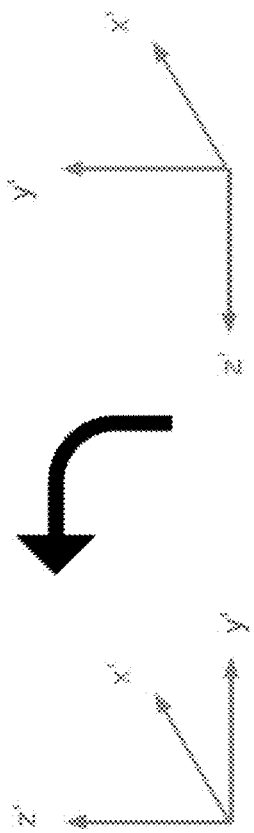
Figure 10C:
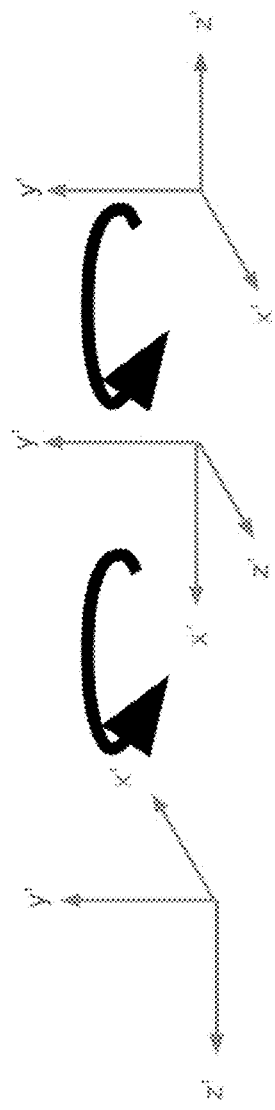
Figure 10D:
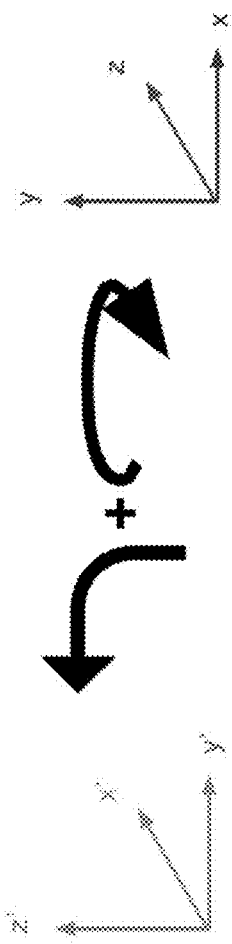

This transformation from the survey coordinate frame to the global coordinate frame, shown in FIG. 10A as the transformation from (x, y, z) to (x', y', z'), can be accomplished with a single rotation, e.g., as shown in FIG. 10B. It can also be accomplished with three steps as in FIG. 9. In step 902, the survey coordinate frame is rotated to align the gravity vector, which points down in the global coordinate frame, with the survey coordinate frame vector (0, 0, 1). This rotation accounts for the possibility that the surveying device may be oriented at an arbitrary angle when surveying begins. The rotation in step 902 is not necessarily a unique rotation as shown in FIG. 10C. In step 904, the survey coordinates are rotated about the z axis in the survey coordinate frame to pin the ending point in the survey coordinate frame to the ending point in the global coordinate frame. Together, the alignment with the gravity vector and the mapping of the ending point uniquely determine the rotation that transforms the survey coordinate frame to the global coordinate frame as shown in FIG. 10D. The lateral coordinates in the survey coordinate frame are then scaled and translated to the global coordinate frame in step 906. If desired, the relative distance measurements made using the IR camera and structured IR illumination can be used to adjust or fine-tune the scaling of the lateral coordinates.

Aligning Different Surveys of the Same Section of Curb

Figure 11:
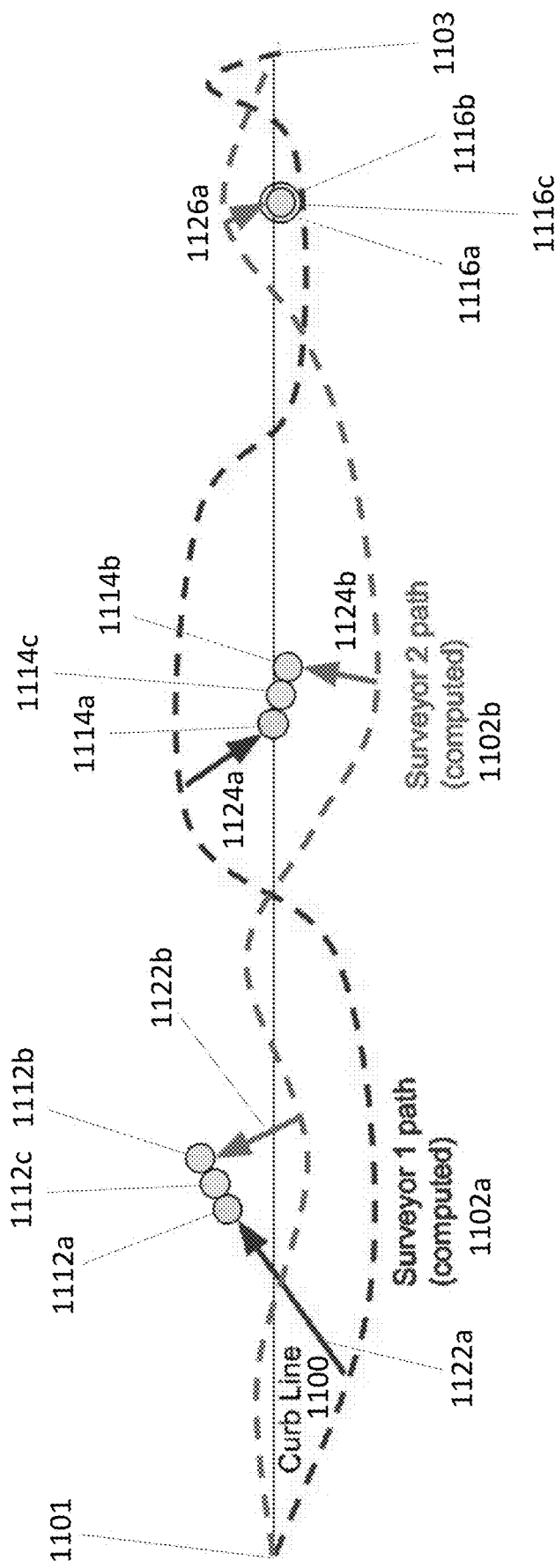
FIG. 11 illustrates two surveys of the same section of curb with two or more common objects.

FIG. 11 illustrates two different surveys of a curb section 1100 that extends from a known starting point 1101 to a known ending point 1103. The first survey extends along a first nonlinear path 1102a (indeed, a somewhat arbitrarily curving path) about the edge of the curb section 1100. The second survey extends along a second nonlinear path 1102b that forms a rough mirror image of the first nonlinear path 1102a about the edge of the curb section 1100.

Each survey also includes pictures of objects, such as signs, fire hydrants, and bike racks, on the curb. The surveyors took these pictures from different vantage points, which can cause the objects to appear as though they're at different locations. For example, a first object 1112c appears closer to the curb line (1112a) in the first survey and farther from the curb line (1112b) in the second survey, possibly because the surveyors imaged the first object 1112c from different perspectives 1122a and 1122b. Similarly, a second object 1114c appears farther from the curb line (1114a) in the first survey and closer to the curb line (1114b) in the second survey, possibly because the surveyors imaged the second object 1114c from different perspectives 1124a and 1124b. But the representations 1116a and 1116b of a third object 1116c appear coincident.

In any event, the surveys can be transformed from relative coordinate frames to the same absolute coordinate frame using the locations of the starting point 1101 and the ending point 1103 and the techniques described with respect to FIGS. 10A-10D. If the resulting transformations yield discrepancies in the absolute coordinates of the surveyed objects (e.g., objects 1112c and 1114c), the discrepancies can be reconciled using the techniques described above or any other suitable technique.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided.

The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of surveying an object with a surveying device comprising a camera and an inertial measurement unit, the method comprising:
   starting a visual inertial odometry measurement of a curbside feature by the surveying device at a predefined starting point on the curbside feature by selecting the predefined starting point from a map displayed on the surveying device and marking the predefined starting point on the map in response to a user of the surveying device arriving to a location that corresponds with the predefined starting point;
   determining, using the inertial measurement unit of the surveying device, at particular intervals, a position in three dimensions and an orientation of the surveying device relative to an initial position and an initial orientation at the predefined starting point as the user of the surveying device is traversing a nonlinear path along the curbside feature from the predefined starting point to a predefined ending point on the curbside feature;
   acquiring, using the camera of the surveying device, an image of an object of interest that is proximal to the curbside feature with the surveying device while traversing the nonlinear path;
   recording object coordinates associated with the image of the object of interest, the object coordinates being in a survey coordinate frame having the predefined starting point as an origin;
   ending the visual inertial odometry measurement by the surveying device, in response to the surveying device detecting the predefined ending point on the curbside feature; and
   generating a survey of the curbside feature that includes a representation of the nonlinear path about an edge of the curbside feature based on the determined position and orientation of the surveying device at the particular intervals and the image of the object of interest that is proximal to the curbside feature.

2. The method of claim 1, further comprising:
   measuring a direction of gravity with the surveying device while carrying the surveying device along the nonlinear path.

3. The method of claim 1, wherein recording the object coordinates comprises recording a height of the surveying device above the curbside feature.

4. The method of claim 1, further comprising:
   measuring a direction of gravity with the surveying device while acquiring the image of the curbside feature.

5. The method of claim 4, further comprising:
   rotating the survey coordinate frame to align a vertical axis in the survey coordinate frame with the direction of gravity.

6. The method of claim 5, further comprising:
rotating the survey coordinate frame about the vertical axis in the survey coordinate frame based on the predefined starting point in the survey coordinate frame and a Geographic Information System (GIS) coordinate frame.

7. The method of claim 6, further comprising:
at least one of translating or scaling lateral coordinates in the survey coordinate frame to respective coordinates in the GIS coordinate frame.

8. The method of claim 1, further comprising:
measuring a distance from the surveying device to the curbside feature using structured illumination.

9. An apparatus for surveying an object, the apparatus comprising:
a camera configured to automatically acquire images of objects of interest on a curbside feature while the apparatus is traversing a nonlinear path along the object curbside feature;
an inertial measurement unit (IMU) configured to measure a motion of the apparatus while the apparatus is traversing the nonlinear path along the object; and
a processor, operably coupled to the camera and the IMU, configured to:
start a visual inertial odometry measurement of a curbside feature by the surveying device at a predefined starting point on the curbside feature by selecting the predefined starting point from a map displayed on the surveying device and marking the predefined starting point on the map in response to a user of the surveying device arriving to a location that corresponds with the predefined starting point;
determine, at particular intervals, a position in three dimensions and an orientation of the surveying device relative to an initial position and an initial orientation at the predefined starting point as the user of the surveying device is traversing a nonlinear path along the curbside feature from the predefined starting point on the curbside feature to a predefined ending point on the curbside feature while the apparatus is traversing the nonlinear path along the object;
acquire, using the camera, an image of an object of interest that is proximal to the curbside feature with the surveying device while traversing the nonlinear path;
record object coordinates associated with the image of the object of interest, the object coordinates being in a survey coordinate frame having the predefined starting point as an origin;
automatically end the visual inertial odometry measurement in response to detecting that the apparatus is at the predefined ending point; and
generate a survey of the curbside feature that includes a representation of the nonlinear path about an edge of the curbside feature based on the determined position and orientation of the surveying device at the particular intervals and the image of the object of interest that is proximal to the curbside feature.

10. The apparatus of claim 9, wherein the IMU is configured to measure a direction of gravity while the apparatus is traversing the nonlinear path along the curbside feature.

11. The apparatus of claim 9, wherein the processor is configured to record a height of the apparatus above the object while the apparatus is traversing the nonlinear path along the curbside feature.

12. The apparatus of claim 9, further comprising:
an infrared (IR) light source to illuminate the object on the curbside feature with IR structured illumination;
an IR detector, operably coupled to the processor, to detect IR structured illumination scattered or reflected by the object on the curbside feature, and
wherein the processor is configured to determine a distance to the object based on the IR structured illumination detected by the IR detector.

* * * * *